United States Patent [19]

Bolte

[11] Patent Number: 4,731,171

[45] Date of Patent: Mar. 15, 1988

[54] PROCESS FOR MAKING A LID HAVING A TEAR-AWAY OPENING

[75] Inventor: Georg Bolte, Vechelde, Fed. Rep. of Germany

[73] Assignee: Schmalbach-Lubeca AG, Braunschweig, Fed. Rep. of Germany

[21] Appl. No.: 858,938

[22] Filed: Apr. 30, 1986

[30] Foreign Application Priority Data

May 2, 1985 [DE] Fed. Rep. of Germany ....... 3515672

[51] Int. Cl.[4] ....................... C25D 13/00; B65G 15/58; B65G 17/46; B21D 51/44

[52] U.S. Cl. .............................. 204/181.6; 204/180.2; 204/297 M; 198/803.6; 198/690.1; 198/487.1; 198/472.1; 413/18; 413/19; 413/60

[58] Field of Search .......... 427/12; 198/803.6, 803.12, 198/690.1, 472.1, 487.1; 413/18, 19, 20, 60, 61; 204/297 M, 299 EC, 300 EC, 297 W, 180.2, 180.3, 180.5, 180.6, 181.1, 181.2, 181.3, 181.4, 181.5, 181.6, 181.7

[56] References Cited

U.S. PATENT DOCUMENTS

| | | | |
|---|---|---|---|
| 2,448,116 | 8/1948 | Pearson et al. | 204/297 M X |
| 3,510,022 | 5/1970 | Heller | 220/270 |
| 3,759,810 | 9/1973 | Landauer et al. | 204/181.1 |
| 3,847,786 | 11/1974 | Landauer et al. | 204/300 EC |
| 4,005,000 | 1/1977 | Kvaska | 204/180.2 |
| 4,081,344 | 3/1978 | Shindou et al. | 204/181.4 X |

FOREIGN PATENT DOCUMENTS

| | | |
|---|---|---|
| 1927436 | 12/1969 | Fed. Rep. of Germany . |
| 3120880 | 12/1982 | Fed. Rep. of Germany . |

*Primary Examiner*—John F. Niebling
*Assistant Examiner*—John S. Starsiak, Jr.
*Attorney, Agent, or Firm*—Karl F. Ross; Herbert Dubno

[57] ABSTRACT

The process and apparatus of the invention provide a coat of lacquer or varnish covering a tear-off cover, which is formed from a thin ferromagnetic metal, has a circumferential supporting lip and is equipped with a tear-off opening made by scoring and/or punching in or out the cover surface. To provide the coat of lacquer or varnish the cover is moved through an electric coating tank, a washing tank and drying zone with the plane of the cover oriented substantially vertically while being supported exclusively on the surface of the inner wall of the supporting lip. The entire surface of the cover is completely covered by the lacquer or varnish coating except for a small portion on the inner wall of the supporting lip which is positioned inside the closed container in a folded seam and/or covered by a sealing material.

1 Claim, 6 Drawing Figures

PROCESS FOR MAKING A LID HAVING A TEAR-AWAY OPENING

FIELD OF THE INVENTION

My present invention relates to a process for making a cover or lid and, more particularly, to a process for making a metal cover or lid having a tear-away opening and a corrosion resistant coating.

BACKGROUND OF THE INVENTION

A cover or lid, which is composed of a ferromagnetic material, can be punched and/or deep drawn from the ferromagnetic sheet material thereby providing it with a circumferential supporting lip, scoring or punching out or in the surface of the cover or lid to form a tear-out opening, and coating the cover or lid completely with a lacquer, varnish or paint coating. In the case of punching out the tear-out opening the cover or lid is equipped with a covering sealed tear-off foil, preferably a plastic-aluminum foil.

In making a tear-out cover according to the above process the lacquer or varnish coating of the cover or lid is provided by applying the lacquer or varnish to both sides of a blank and subsequently the blank is provided with the supporting lip and is scored and/or the surface is punched in or out. When, instead of scoring to define the opening to be formed later, an opening is punched out, the subsequent closure of the tear-off opening could occur by sealing on a tear-off foil as previously mentioned.

However the shaping of the cover or lid after the lacquer or varnish coating of the blank requires a very flexible coating which during the required shaping of the blank does not tend to rip or peel off. Such lacquers are not always available or reliable.

Additional problems arise when the scoring and/or the punching in or out of the cover or lid surface occurs after the coating process. Particularly cut edges arise at the scored places or at the edges of the punched in or out openings which are especially susceptible to corrosion.

These covers or lids can only be used in a container for dry goods unless additional steps are taken to provide the endangered region with a corrosion resistant coating. For this purpose protection of these cut edges must be undertaken by either a subsequent coating process or an additional covering by an inner foil, that is, a foil applied in the container interior near the cover or lid.

A turning or folding over of the edges of the punched out opening is also possible so that these cut edges are on the outside of the cover when the cover closes the container and thus contact with the goods in the container is prevented.

However these outside cut edges are endangered by corrosion even when they are covered by the sealed on tear-off foil.

OBJECTS OF THE INVENTION

It is an object of my invention to provide an improved process for making a container cover.

It is also an object of my invention to provide an improved process for coating a container cover with a corrosion resistant coating.

It is a further object of my invention to provide a container cover having a tear-away opening with a lacquer, varnish or paint coating which provided protection against corrosion and allows wet or moist materials to be stored in the container.

SUMMARY OF THE INVENTION

These objects and others which will be made more apparent hereinafter are attained in accordance with my invention in a process for making a cover or lid, which is composed of a ferromagnetic material, comprising punching and deep drawing the ferromagnetic material, providing it with a circumferential supporting lip, coating it with a lacquer or varnish coating, and scoring or punching out or in the surface of the cover or lid to form a tear-out opening, wherein in the case of punching out the tear-out opening the cover or lid is equipped with a covering sealed tear-off, preferably a plastic-aluminum foil.

According to my invention after scoring and/or punching out or in the surface of the cover or lid to form the tear-out opening, the container cover is moved through an electric coating tank to provide a lacquer or varnish electrocoating completely covering it electrophoretically except on the surface of an inner wall of the circumferential supporting lip which has previously been formed by a turned-in edge of the cover.

Also advantageously the container cover is coated with the plane of the cover or lid surface oriented substantially vertically and is subsequently subjected to a washing and drying treatment.

By the above coating process for the cover or lid with the scoring and/or the surface punched out or for formation of the tear-off opening an augmented-thickness lacquer or varnish coating is provided in the vicinity of the cut edges of the lid or cover, because the deposition of the lacquer or varnish component from the coating tank is especially intense at the cut edges as a result of the increased electrostatic field strength there.

Support for the cover or lid during the coating process is provided in the vicinity of the supporting surfaces or points of support which are located on the surfaces of the inner wall of the supporting lip which can not be reached by the lacquer or varnish during the coating process.

During later application of a sealing material to this supporting lip (when the cover is to be applied to a container) these surfaces are covered by the sealing material. When the cover is then placed on the container associated with it these surfaces which have not been coated with corrosion resistant lacquer or varnish are actually in the container interior in the vicinity of a folded seam where they are completely protected from exterior influences.

It is sufficient and suitable for the purposes of my invention to hold the cover or lid in place by a magnetic field during its motion through the electric coating tank and during the subsequent washing and drying treatment. In this way the cover or lid can be pressed to a hanging means without requiring that a pressing member come into contact with the surface of the cover or lid.

My apparatus for performing the above described process comprises a conveyor positioned above the electric coating tank and a plurality of pairs of hangers immersible in the electric coating tank under the guidance of the conveyor being mounted oriented in at least one row longitudinally along the conveyor.

Two rows can be spaced transversely from each other and each of the pairs of hangers are equipped with opposing supporting fingers and are oriented so that the supporting fingers project transversely to the conveyor for engagement in the supporting lip of the cover or lid to support them. A magnetic rail extends between each of the hangers of each of the hanging means arranged in an individual row longitudinally along the conveyor.

The conveyor can have a downwardly directed inclined segment for conducting the hanging means or pairs of hangers with the covers held on it in the feed direction so that the hanging means with the covers attached are immersed in the coating tank while running along the path of this conveyor.

A horizontal middle segment of the conveyor below the surface of the coating bath fluid is connected to the first downwardly inclined segment.

Subsequently a segment of the conveyor inclined upwardly to bring the hanging means with the covers or lids again above the surface of the coating tank fluid is connected to the horizontal central segment. In the same way the conveyor can be conducted through a wash tank before being passes through a final drying zone.

The fixed magnetic rails are positioned so that they follow the path of the conveyor. They also pass through the electric coating tank and the following wash tank and operate over the entire conveyor path traversed by the hanging means and/or the covers attached thereon to press the covers to the hangers. A plurality of magnetic members disposed adjacent one another can provide the magnetic rail.

The covers or lids are held on the projecting supporting fingers of the hangers of the hanging means or pairs of hangers by the magnetic field. Usually three supporting fingers are used to hold a cover or lid securely in position on the hanger.

The pressing force on the cover or lid due to the magnetic field can be comparatively small since the weight of the cover is small and also during motion of the cover or lid through the coating tank or the wash tank only a slight force is exerted on the cover due to the relative motion through the tank or bath.

Advantageously the hanging means or the pairs of hangers are mounted on a mounting rod attached parallel to a supporting bar connected to the conveyor or between the conveyor segments. It is also possible to mount several pairs of hangers or hanging means transversely next to each other. In this way the entire width of the electric coating tank can be utilized to coat the covers or lid.

In one embodiment of my invention the hangers comprise three linear rod members which define a three cornered figure (triangle) and the supporting fingers comprise projecting rod pieces positioned at the corners (vertices) of the triangle. This embodiment is particularly suitable for coating of circular cross section covers or lids.

The mounting of the cover or lid occurs on the outside of the hanger so that the magnetic rail exerts a pulling force which holds the cover on the hanger. The cover is held on the exteriorly directed supporting fingers of the hanger.

Advantageously the conveyor can also be used as one electrical conductor for the electric coating tank while the other electrode is positioned along the bottom of the coating tank.

The magnetic rails can be held either by a bridge mounted on the tank bottom or on a corresponding holding device outside of the tank. Alternatively they can be mounted on individual supporting members. The magnetic rails can be formed from a plurality of permanently magnetized segments positioned in a row following each other.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
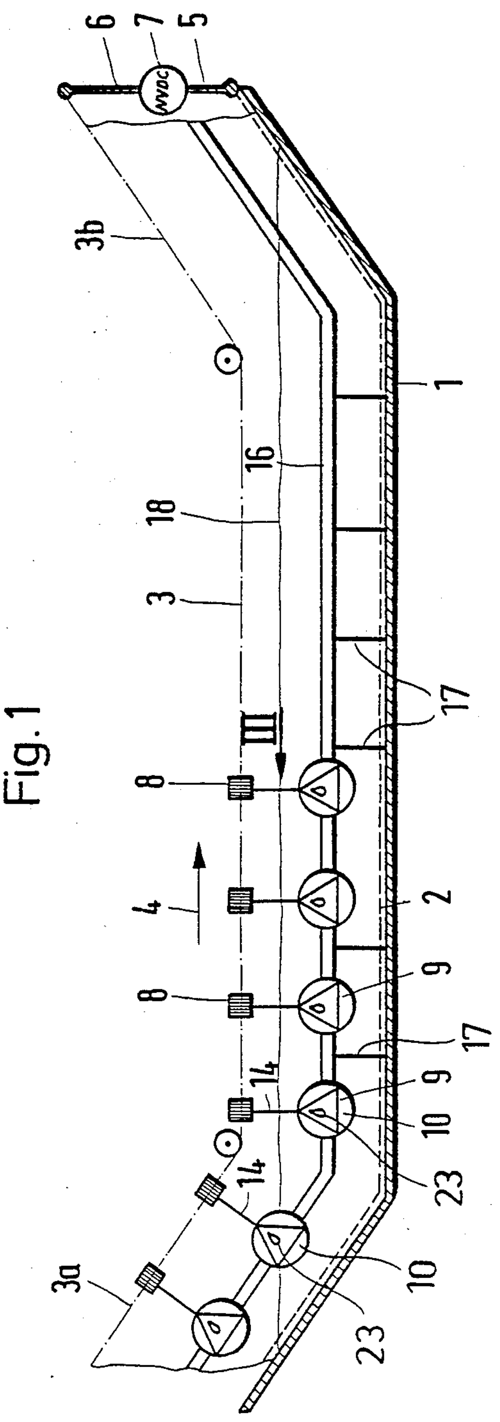
FIG. 1 is a vertical cross sectional view through an apparatus for performing the process according to my invention including an electric coating tank with associated conveyor mounted over it taken along the feed direction of the conveyor.

FIG. 1 shows an electric coating tank 1 in the shape of a basin. Along the bottom of the electric coating tank 1 an electrode 2 is shown with a broken dashed line. A conveyor 3 (e.g. a chain or cable) shown by a dot-dash broken line is provided above the tank 1. This conveyor 3 is driven in the direction of the arrow 4 and also serves as the other electrode.

On the right side of FIG. 1 a direct current source 7 is shown with a pole 5 connected to the electrode 2 which extends along the bottom of the tank 1 and with a pole 6 which is connected to the conveyor 3.

The conveyor 3 is equipped with a plurality of supporting bars 8 oriented transversely to the conveyor feed direction, which are held between or below the individual conveyor members and are arranged so that they do not prevent the guiding of conveyor 3 around its guide rollers (not shown) at the end of the path.

Hanger means 9 are attached to the supporting bars 8 projecting down from them and receive the prepared cover or lid 10. The prepared cover or lid 10 has a scored or a punched in or punched out covering surface forming a tear-out opening 23. This cover or lid 10, e.g. of steel or tin-plated steel sheet, is shown in the drawing only schematically with the tear-out opening 23.

The conveyor 3 has an section **3*a* inclined downwardly in the feed direction above the electric coating tank 1 and connected to a central section running parallel to and below the fluid lever 18. At its other end the conveyor 3 has a section 3*b* slanted upwardly from the central section and connected to it. The hanger means 9 attached to the supporting bars 8** with the covers or lids

10 mounted thereon reach and are immersed in the electric coating tank varnish or lacquer. In the vicinity of section 3*b* climbing from the coating tank fluid the hanger means 9 are withdrawn from the fluid.

Figure 2:
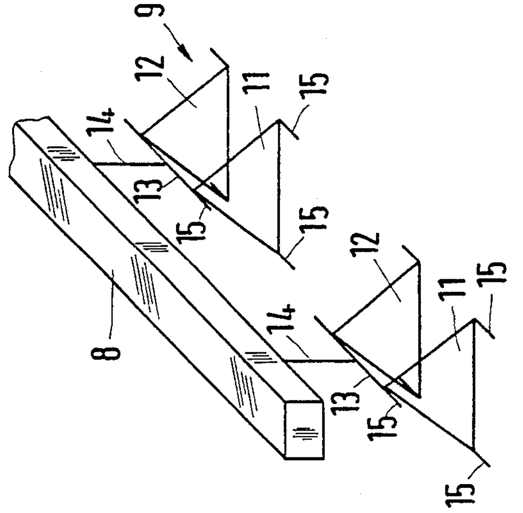
FIG. 2 is a more highly schematic perspective view of an individual component used for carrying the cover or lid from the apparatus of FIG. 1 shown without the cover or lid.
Figure 3:
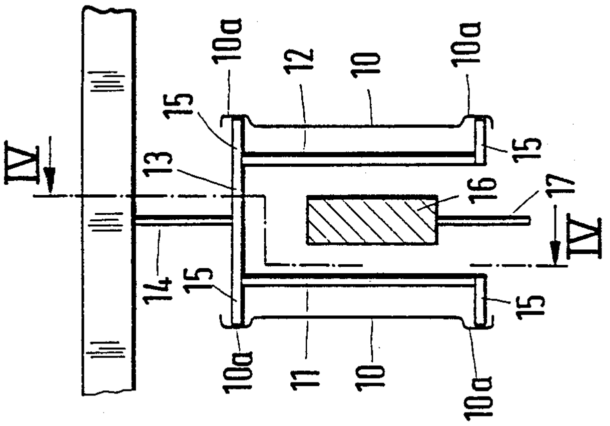
FIG. 3 is an enlarged view of a part of the apparatus of FIG. 1 as seen in the direction of an arrow III in FIG. 1.
Figure 4:
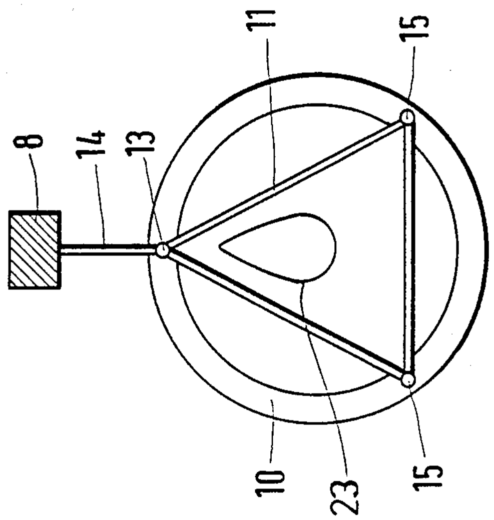
FIG. 4 is a cross sectional view of a portion of the apparatus of FIG. 1 taken along the section line IV—IV.

The hanging means 9 are particularly clearly shown in FIGS. 2 to 4. Each hanging means 9 contains two hangers 11 and 12 comprising three rod members enclosing a three cornered (triangular) surface attached to a mounting rod 13 which is hung from the supporting bar 8 by a connecting member 14. Thus a row of hanging means 9 can be provided in the longitudinal direction along the supporting bar 8, which are spaced so that the covers or lids 10 can be held on both sides of the hanging means 9.

The hangers 11 and 12 of the hanging means 9 are equipped with mounting fingers 15 directed exteriorly. Each of the mounting fingers 15 formed as a rod piece projects as shown in FIG. 2 from a corner of one of the three cornered hangers 12 and 13. The upper supporting finger 15 is formed by an extension of the mounting rod 13.

Magnetic rails 16 are provided parallel to the conveyor 3 and positioned so that each of the rails 16 is between each pair of hangers 11 and 12 of each of the hanging means 9 which are aligned in a row longitudinally along the conveyor 3. As seen from FIGS. 2 and 3 in the embodiment shown in the drawing a magnetic rail 16 is straddled by the triangles 11, 12 of a respective pair of hangers; magnetic rails 16 are mounted on a plurality of rail supports 17 projecting from the bottom of the tank 1 and spaced from each other. The magnetic rails 16 are each composed of permanently magnetic material. They can comprise a plurality of individual segments which are arranged in a row along the path of the hangers 11 and 12 along the conveyor 3 and are so positioned that they extend continuously between the hangers 11 and 12 along the full path of every hanging means 9 in a given row.

FIG. 3 clearly shows that the mounting fingers 15 of the hanging means 9 engage the surface of inner wall of the supporting lip 10*a* of the cover or lip 10, whereby the cover or lip 10 is held in the position shown in FIG. 3 by a magnetic force field generated by the magnetic rail 16 pressed against the mounting fingers 15.

When the cover or lid 10 is magnetically supported vertically on the mounting fingers 15 engaging in the supporting lip 10*a* of the cover or lid 10, the covers are immersed in the lacquer and an electric coating process occurs as the cover or lid 10 is passed through the electric coating tank 1.

The result of that process is a coating completely surrounding the container cover 10 except on the comparatively small supporting surfaces of the supporting lip 10*a* upon which the tips of the mounting fingers 15 bear.

These comparatively small supporting surfaces of the supporting lip 10*a* are in that region of the cover or lid 10 which is covered in later applications of a sealing material to the supporting lip and on attachment of the container cover 10 to a container are positioned in the interior of the container between the container cover 10 and the open edge of the container forming a folded seam. Thus the danger of corrosion in this uncoated place is practically completely eliminated. All other surface areas of the cover or lid 10, particularly also the cut edges, are completely coated on passage of the cover or lid 10 through the electrostatic coating tank 1.

Figure 5:
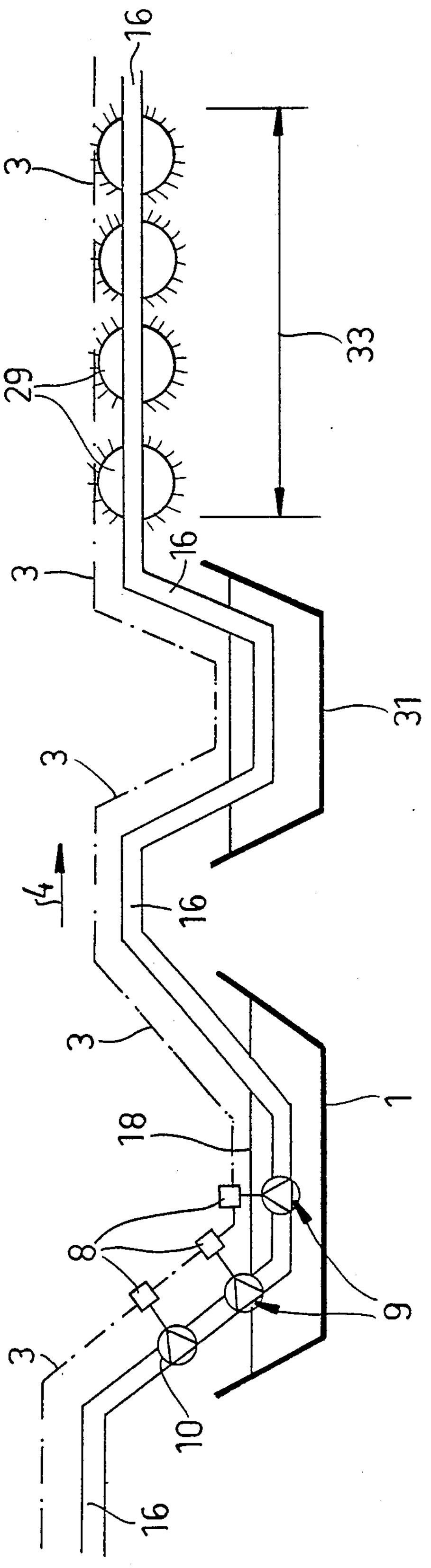
FIG. 5 is a vertical cross sectional view showing the apparatus in the context of additional devices for washing and drying.

As shown in FIG. 5 the subsequent feeding of the cover or lid 10 through a wash tank 31 following the electric coating tank 1 can proceed in a known way as described in the summary. For this purpose the magnetic rails 16 can be extended through the wash tank 31 and further out from the wash tank 31 through a drying zone 33. The cover or lid 10 is held on the hanging means 9 by operation of the magnetic force field 21 until the completion of the drying process by a drying means such as a source of infrared radiation 29.

Figure 6:
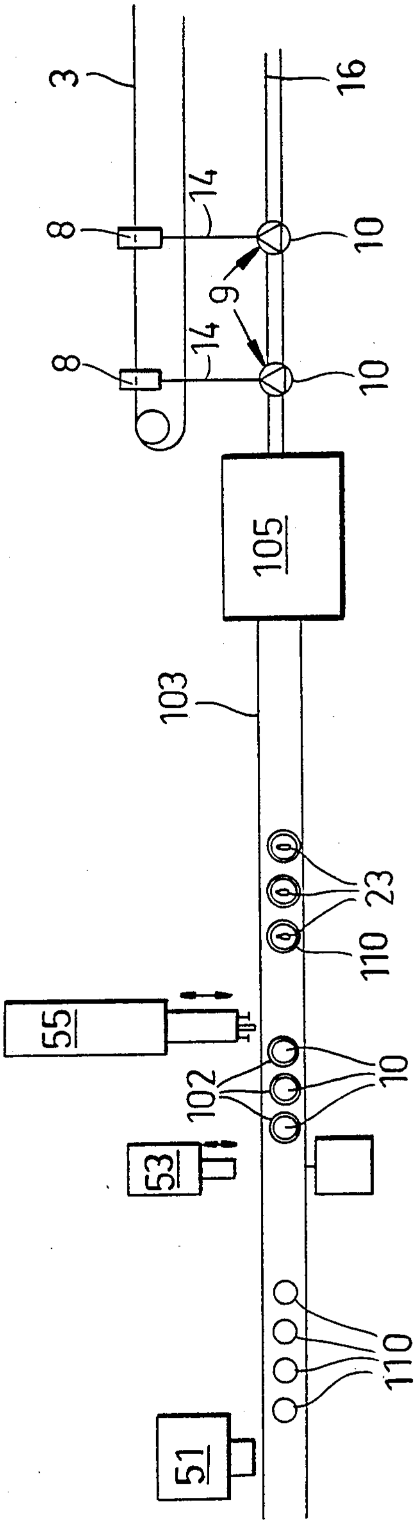
FIG. 6 is a cross sectional view showing additional devices required to perform the steps of my process prior to coating.

The devices necessary for performing the steps of the process prior to the electric coating process are shown in FIG. 6. First a blank is acted on by a punching out and deep drawing machine 51. The press machine or press 53 is used to form a circumferential supporting lip 10*a* on the cover or lid 10. A tear-out opening punch 55 for making a tear-out opening acts on the cover or lid 10 conveyed to it by conveyor 103 to form a tear-out opening 23 in the cover or lid 10. Subsequently this is covered by a plastic-aluminum foil piece which is sealed on the cover or lid 10 by the foil applicator 105. Then the cover or lid 10 is mounted on the hanging means 9 for passage through the electric coating bath 1.

I claim:

1. A method of coating a container cover of ferromagnetic material having a turned rim with an anticorrosive lacquer, comprising the steps of:
   - engaging said cover and holding said cover vertically on a holder having three generally horizontal pins extending into said rim and contacting said cover only within said rim;
   - transporting said holder with said cover engaged thereon along a transport path;
   - retaining said cover on said pins by maintaining said holder in a predetermined space relationship alongside a magnetic rail extending along the length of said transport path whereby a magnetic field from said rail attracts said cover onto said pins;
   - providing a bath of said lacquer along said path so that while said cover is maintained vertical, it is displaced through said immersed in said bath; and
   - electrophoretically depositing said lacquer from said bath on said cover while it is immersed in said bath.

* * * * *